Patented Feb. 13, 1923.

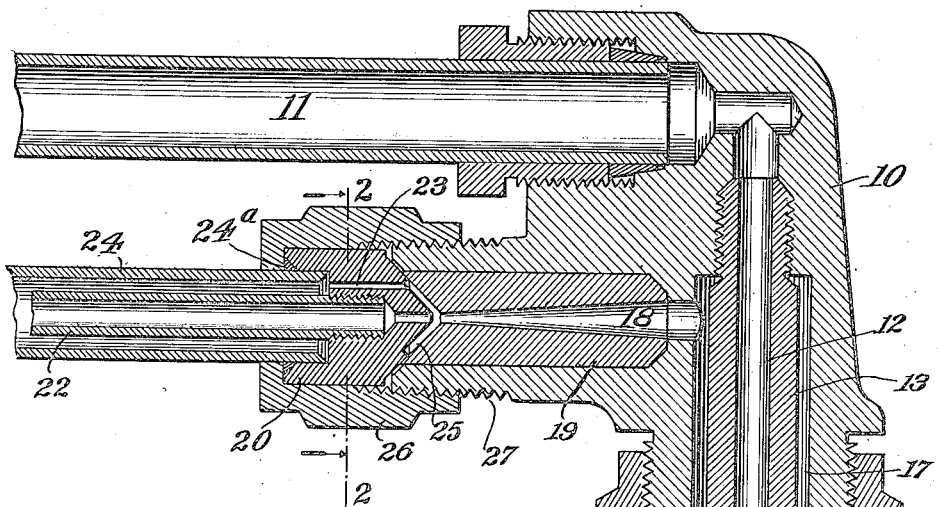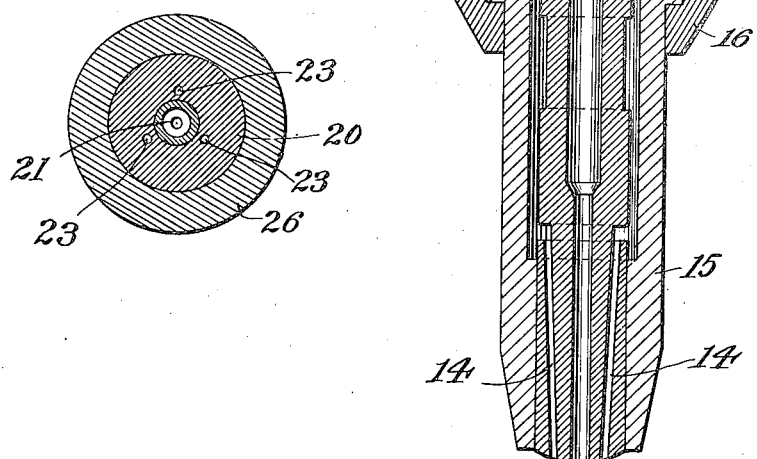

1,444,985

UNITED STATES PATENT OFFICE.

FRANK W. SMITH, OF CRANFORD, NEW JERSEY, ASSIGNOR TO OXWELD ACETYLENE COMPANY, OF NEWARK, NEW JERSEY, A CORPORATION OF WEST VIRGINIA.

OXYACETYLENE BLOWPIPE.

Application filed January 13, 1920. Serial No. 351,086.

*To all whom it may concern:*

Be it known that I, FRANK W. SMITH, a citizen of the United States of America, residing at Cranford, in the county of Union and State of New Jersey, have invented certain new and useful Improvements in Oxyacetylene Blowpipes, of which the following is a full, clear, and exact description.

This invention relates to blowpipes or torches of the so-called oxyacetylene type generally, and particularly to cutting torches in which a preheating flame of high temperature is used, with a jet of oxygen to oxidize the preheated metal. Heretofore some difficulty has been encountered in preventing or controlling what is known as backfiring, that is, flashing back of the flame into the torch with consequent injury and sometimes actual destruction of the parts by the high heat to which they are thus subjected. I have accordingly been led to devise my present invention, which has for its chief object to provide a torch in which back firing is practically eliminated. A further object is to provide for the purpose a torch of simpler construction which can be taken apart and reassembled with the same accuracy of adjustment as originally. To these and other ends the invention consists in the novel features and combinations hereinafter described.

Referring to the accompanying drawing, Fig. 1 is a longitudinal section of the preferred embodiment of the invention.

Fig. 2 is a cross section on line 2—2 of Fig. 1.

Oxygen for the oxidizing or cutting jet is supplied to the head 10 by a pipe 11 and passes to the bore 12 of the inner nozzle 13 which also has passages 14 for the preheating jets and is enclosed at its outer end by an outer shell or tip 15 removably secured to the head by the threaded coupling 16.

The mixture of oxygen and acetylene or other combustible gas for the preheating jets is supplied to the annular space 17 (around the inner nozzle 13) from a flaring bore or mixing passage 18, which, preferably, is formed in a plug member 19 fitted tightly in a cavity in the head 10. At the rear of member 19 is a nozzle 20 having a central passage 21 receiving acetylene from a pipe 22 which is threaded in place and is connected with a source of acetylene under suitable pressure, not shown. The member or nozzle 20 is also provided with one or more passages 23 receiving oxygen at the rear from a pipe 24 and delivering to a converging space or chamber 25 around the orifice of the acetylene passage 21. The pipe 24 is fitted into the rear end of nozzle 20 and is sealed therein by a ring or solder, as indicated at 24ª. A removable coupling or collar 26, threaded on the neck 27 of the head 10, serves to hold the nozzle 20 in place with its tapered or conical front surface in sealing contact with the correspondingly shaped seat in the rear of the mixing chamber 18.

The acetylene under pressure issues from the passage 21 in nozzle 20 with considerable velocity, and mixes with oxygen (supplied at slightly higher pressure to the converging chamber 25), the mixture passing into the flaring mixing chamber 18 where the two gases mix and pass thence to the passage 17. It is now well recognized that in order to prevent or minimize back-firing the capacity of the converging chamber 25, passages 21 and 23, and mixing chamber 18, should be accurately proportioned, but in the past considerable difficulty has been experienced in getting chamber 25 of the right depth or thickness, so to speak, particularly in reassembling the parts after they have been removed for any purpose. According to the present invention this converging chamber is made in the form of a conical recess in member 19 or 20, preferably the latter, in which case the conical surface in the rear end of the mixing chamber 19 is made to overhang or overlap the periphery or outer edge of the chamber 25 to form a seat for the nozzle 20. The parts being originally machined with the necessary accuracy it will be seen that since there is only one surface of contact, to wit, between the nozzle 20 and mixing chamber 19, the parts cannot be improperly assembled, no matter how often they are removed, if only the coupling 26 is set up enough to bring the nozzle 20 firmly down upon its seat. The converging chamber 25 is thus absolutely constant in all its dimensions. It might be supposed equally effective to omit the recess 25 from nozzle 20 and making the mixing chamber 19 short enough to leave a space of the desired size between the parts. In theory this is true, but in practice the difficulties encountered are very great, for it will be observed, first, that if the mixing chamber is to seat at its front end, then its length must be accurately proportioned with respect to the seat at the front and with respect to the seat (at the rear of neck 27) in which nozzle 20 would then have to fit; or, second, if the mixing chamber 19 does not seat at its front end, then it would have to be positioned in the neck 27 with great accuracy, and even slight displacement would seriously impair the adjustment. On the other hand, by making the two members 19 and 20 seat together, and putting the recess 25 in one and only one of them, the difficulties that otherwise would be encountered are avoided and the original proportions are inevitably maintained.

It is to be understood that the invention is not limited to the structure herein specifically illustrated and described but can be embodied in other forms without departure from its spirit.

I claim:

In an oxyacetylene torch, in combination, a head having a cavity and a threaded portion outside said cavity, a plug fitting tightly in said cavity, said plug having a mixing chamber and terminating at its rear in a tapering seat, a nozzle having a central longitudinal passage and a tapering surface at its front end seated in said tapering seat, the front end of said nozzle having a recess therein forming in conjunction with said tapered seat a converging chamber for a gas which is to be mixed with a gas issuing from said central passage, said nozzle also having one or more passages discharging into said converging chamber, and a coupling threaded to engage said threaded portion of said head and engaging said nozzle to hold the same on its tapered seat in gas-tight contact therewith.

In testimony whereof I hereunto affix my signature.

FRANK W. SMITH.